W. ANDERSON.
BREAD KNIFE.
APPLICATION FILED MAY 9, 1916.
1,254,563.
Patented Jan. 22, 1918.
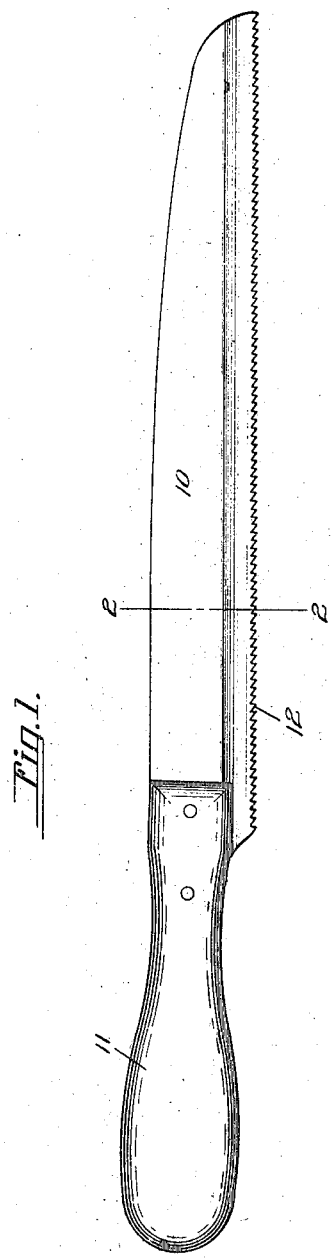
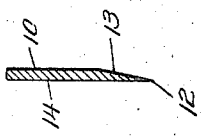
Witnesses
F. C. Gibson.
Inventor
William Anderson.
By Victor J. Evans
Attorney

UNITED STATES PATENT OFFICE.

WILLIAM ANDERSON, OF HARRISBURG, PENNSYLVANIA.

BREAD-KNIFE.

1,254,563.    Specification of Letters Patent.   Patented Jan. 22, 1918.

Application filed May 9, 1916. Serial No. 96,411.

*To all whom it may concern:*

Be it known that I, WILLIAM ANDERSON, a citizen of the United States, residing at Harrisburg, in the county of Dauphin and State of Pennsylvania, have invented new and useful Improvements in Bread-Knives, of which the following is a specification.

This invention relates to knives and has particular reference to bread knives.

This invention aims to provide a knife wherein the blade has a toothed cutting edge, and beveled at one side to provide a deflecting surface, with a view of forcing the slices of bread away from the loaf as they are severed therefrom, the bevel being continued throughout the length of the teeth.

In the drawing forming part of this specification like numerals of reference indicate similar parts in the several views and wherein:—

Figure 1 is a side elevation.

Fig. 2 is a sectional view taken on line 2—2 of Fig. 1.

Referring more particularly to the drawing in detail 10 indicates the knife blade to one end of which is secured in any suitable manner the handle 11. The blade may vary in shape but as shown in this particular instance is substantially rectangular in cross section and has its cutting edge provided with the teeth 12. The teeth are preferably very fine saw-like teeth and obtain a purchase upon the loaf of bread or other object to be cut as soon as the knife is brought in contact therewith, while a knife of this construction holds its edge considerably longer than a knife of usual construction having a smooth cutting edge.

The blade 10 is beveled on one side only as at 13, the bevel extending throughout the length of the teeth, and provides a deflecting surface for the purpose of forcing the slices of bread away from the loaf as they are severed therefrom, it of course being understood that the bevel can start from any appreciable point in the width of the blade. The opposite side 14 of the blade is perfectly smooth so that the slices can be cut perfectly straight from the loaf.

What is claimed is:—

A bread knife including a blade having a cutting edge, a series of short and very fine teeth of uniform dimensions extending from the blade throughout its length and defining the cutting edge, said blade having a flat side, and the opposite side of the blade being beveled throughout its length, said bevel extending from the point of the teeth beyond the depth of the latter to a point approximately in a plane with the longitudinal center of the blade, thus defining a perfectly flat smooth deflecting surface.

In testimony whereof I affix my signature.

WILLIAM ANDERSON.